(No Model.)
S. M. LILLIE.
PROCESS OF AND APPARATUS FOR USING HEAT IN SUGAR REFINERIES.
No. 428,217. Patented May 20, 1890.
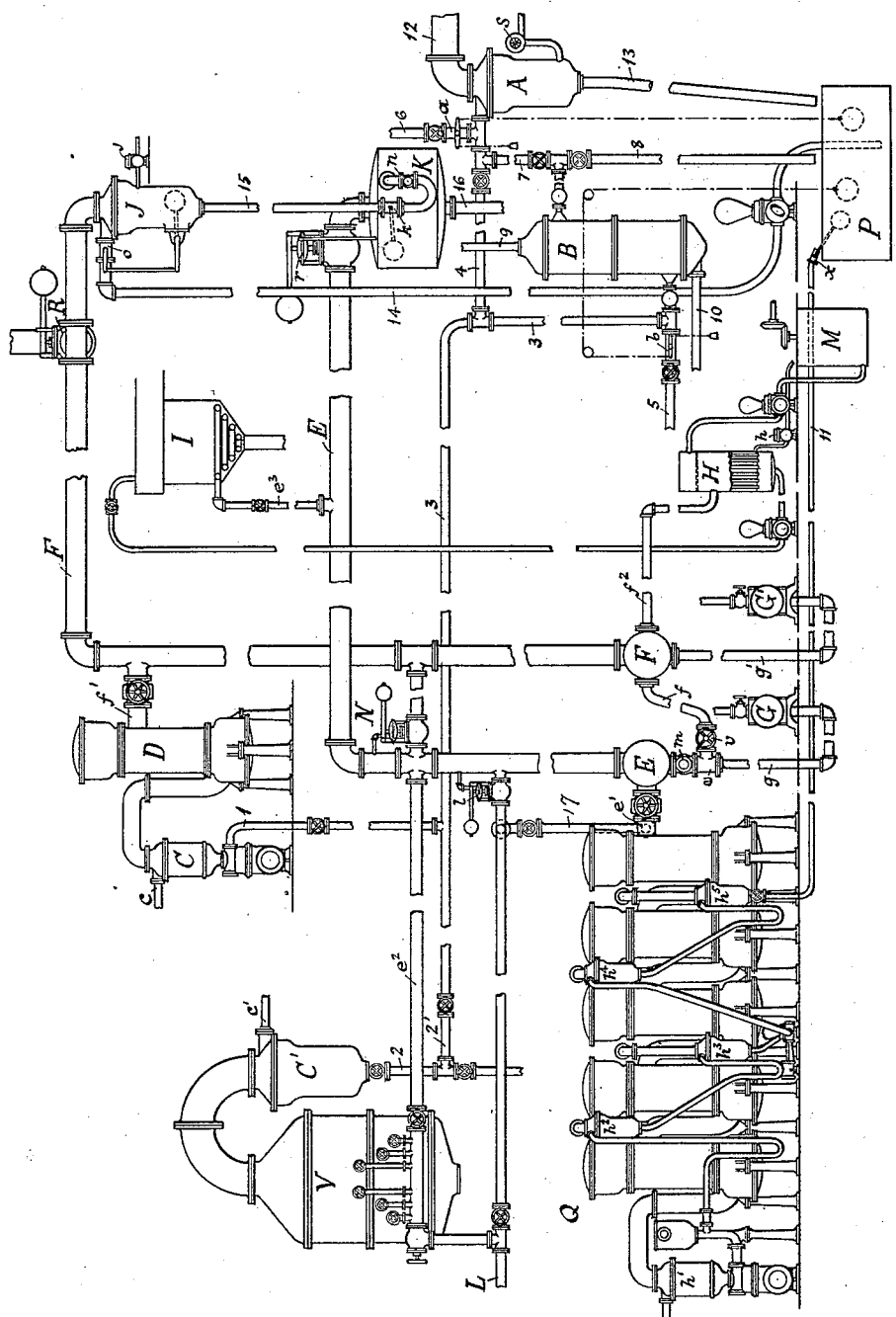
WITNESSES:
Osman P. Stetson.
Amil Umgarth.
INVENTOR
S. Morris Lillie

UNITED STATES PATENT OFFICE.

SAMUEL MORRIS LILLIE, OF PHILADELPHIA, PENNSYLVANIA, ASSIGNOR TO THE SUGAR APPARATUS MANUFACTURING COMPANY, OF SAME PLACE.

PROCESS OF AND APPARATUS FOR USING HEAT IN SUGAR-REFINERIES.

SPECIFICATION forming part of Letters Patent No. 428,217, dated May 20, 1890.

Application filed September 18, 1889. Serial No. 324,362. (No model.)

*To all whom it may concern:*

Be it known that I, SAMUEL MORRIS LILLIE, a citizen of the United States, residing at Philadelphia, in the county of Philadelphia and State of Pennsylvania, have invented a new and useful Process of Using Heat in Sugar-Refineries and Apparatus for Practicing the Same, of which the following is a specification, in which reference is had to the accompanying drawings.

The heat generated in sugar-refineries is due mainly to fuel burned under the boilers and to fuel burned in the bone-black-revivifying kilns. Of this heat a portion escapes in gaseous products of combustion, which pass away to the chimneys from the furnaces of the boilers and kilns, a second portion is lost by radiation from apparatus and materials, while the remainder of the heat passes into the steam generated in the boilers and into the water-vapors driven from the bone-char in process of revivification in the kilns to which the char goes, containing usually about twenty per cent. of water.

My present invention relates exclusively to using the heat contained in the steam from the boilers and in the water-vapors from the revivifying-kilns, which latter are understood to include the driers usually used in connection with them; and with respect to the steam from the boilers my invention relates more especially to the steam which is used in the engines and pumps for power purposes—that is, to the exhaust-steam.

The process consists in exhausting the steam from the engines and pumps of the sugar-refinery into two or more different exhaust-mains, in which different back-pressures are maintained, some of the engines exhausting into one main and some into another, some of the engines and pumps also having exhaust-connections to more than one of the exhaust-mains, so that the exhaust-steam from the same may be changed from one of the exhaust-mains to another, as may be required.

The process consists, further, in using the steam from the different exhaust-mains, respectively, for those heating or evaporating purposes for which their pressures and temperatures are best adapted as regards the economical use of the steam. One of the purposes for which they are used is to complete the heating of the large quantities of water required to be heated for the purposes of the refinery, and which have been partially heated by other sub-processes, as hereinafter set forth.

With respect to the water-vapors from the bone-char-revivifying kilns, the process consists in using the said vapors for heating water, which will be afterward additionally heated before use in the sugar-refining processes by the exhaust-steam from the engines and pumps. For the better understanding of what is to follow, it may be said here that this hot water is principally used for washing bone-char through which a filtration of sugar-liquor has been made, and which flows away from the black still hot, and is then known as "char-washings." These hot char-washings are in this general method of using heat in the sugar-refineries employed in surface-heaters or in other suitable apparatus for heating a portion of the fresh water, which is afterward to be heated by exhaust-steam for use in the refining processes.

In the drawings is represented a combination of apparatus for practicing my invention, in which two exhaust-mains E and F are used in connection with the engines and pumps, E being the high-pressure exhaust-main, in which a back-pressure of fifteen pounds per square inch is maintained, it will be supposed, and F the low-pressure exhaust-main, in which the pressure may be in the neighborhood of atmospheric.

In the drawings, E is a high-pressure exhaust-main, in which the pressure is maintained at from ten to fifteen pounds per square inch or at whatever pressure may be desired. It has branch pipes $e'$ $e^2$, &c., leading to the different apparatus which it supplies with steam.

F is a low-pressure exhaust-main, in which the pressure is variable and dependent upon the various condensing apparatus with which it is connected. As a rule it is below atmospheric pressure, probably. This main is fitted with an adjustable pressure-relief valve R.

It has branch pipes $f'$ $f^2$, &c., leading to the several apparatus which it supplies with steam.

G represents a portion of the engines and pumps of the refinery. The exhaust-main $g$ from each of these engines and pumps has a branch $e$, leading to the high-pressure exhaust-main and containing a check-valve $m$, and another branch $f$, leading to the low-pressure exhaust-main and fitted with a stop-valve $v$. When this stop-valve, in case of any engine or pump, is open, all the steam from that engine or pump passes to the low-pressure exhaust-main, and when the valve is closed the steam all passes into the high-pressure exhaust-main. Sufficient pumps and engines are thus supplied with the double exhaust-connections to meet, when all are exhausting into the high-pressure exhaust-main, the maximum demand for steam that is likely ever to be made on that main during the normal workings of the refinery.

G' represents engines and pumps having their exhaust-mains $g'$ leading into the low-pressure exhaust-main F only.

L is a live-steam main opening into the high-pressure exhaust-main E and fitted with an automatic pressure-regulating valve $l$, which is set so as to maintain in the exhaust-main the least minimum pressure desired therein.

N is an automatic pressure-regulating valve for the high-pressure exhaust-main E, located in a pipe leading from the same into the low-pressure exhaust-main F and set to allow the escape of steam from the main E into the main F when a certain maximum pressure is exceeded in the former. This valve, acting in conjunction with the regulating-valve $l$ in the live-steam main L, maintains the pressure in the exhaust-main E within certain limits, between which the pressure may fluctuate, but which it cannot pass.

M represents melters for dissolving the raw sugars in water to form "raw liquors."

H is a surface-heater, in which raw sugar-liquors are heated to a degree while in transit from the melters M to the blow-ups by low-pressure exhaust-steam supplied to it from the main F by the branch pipe $f^2$. This heater is provided with a small air-pump $h$, to be used when the exhaust-steam is below atmospheric pressure.

I represents "blow-ups," in which the raw liquors partially heated in heater H are heated to 210° Fahrenheit by high-pressure exhaust-steam supplied to it from the main E by the branch pipe $e^3$.

J is a condenser, to which the low-pressure exhaust-main leads, and in which the low-pressure exhaust-steam not condensed in other apparatus is condensed by the fresh water already partially heated by the char-washings, by vapors from the revivifying-kilns, and in the heaters of the multiple effect, all as hereinafter described. The admission of the condensing-water is automatically regulated to conform in quantity to that of the water drawn from the condenser by a valve $o$ in the supply-pipe 14, operated by a float (indicated by a dotted circle) in the condenser; or it might be done by connecting the float with a throttle-valve in the steam-supply pipe of the pump O, which delivers the water to the condenser.

K is a water-heater, into which the high-pressure exhaust-main E leads, and in which the fresh water leaving the condenser J may be heated by the same to any temperature up to that of the high-pressure exhaust-steam. This heater is placed, preferably, sufficiently below the condenser J to insure water flowing of its own weight from the latter into the former through the pipe 15 against any difference in pressure that is likely ever to exist between the two. If it is inconvenient to have the heater K below the condenser J, a pump may be used for delivering water from the latter into the former.

The pipe 15, for conducting the water from the condenser J into the heater K, is fitted with a check-valve $n$ and with a butterfly $k$, which latter valve is automatically operated by a float in the heater to regulate the flow of water into the latter to correspond with that being drawn from it through the pipe 16.

Q is a multiple effect for evaporating sweet waters. It is shown as a quintuple effect with heaters $h'$ $h^2$ $h^3$, &c., one for each effect, through which heaters a portion of the fresh water to be heated passes in succession, and is heated progressively in them by vapors from the several effects to a temperature approaching that of the vapors from the first effect. The heated water flows from the heater $h^5$ of the first effect by the pipe 11 into the tank P.

D is an evaporator for thickening $in$ $vacuo$ and by low-pressure exhaust-steam certain of the refined sugar-liquors after they leave the bone-black and before they are sent to the vacuum-pans to be boiled to grain.

V represents the vacuum-pans, in which the sugar-liquors are boiled to grain. They may be supplied either with exhaust-steam from the main $e^2$ or with live steam from the main L.

B is a surface-heater, in which fresh water is heated by the hot char-washings, the fresh water circulating through the case and around tubes contained in the same, and the char-washings entering by the main 9 and leaving the heater by the main 10, circulating through the tubes in a general direction contrary to that of the fresh water. The water heated may be either cold water from the cold-water main 5 or partially-heated water from the condenser C of the evaporator D brought to it by the connecting-pipes 1 3. The heated fresh water passes from the heater either by the main 7 into the condenser A or by the pipe 8 into the tank P.

A represents a condenser, into which all the vapors driven from the wet char in the revivifying kilns and driers are led and condensed by fresh water, which is to be heated for the purposes of the refinery. This condenser may be a surface-condenser, a spray-condenser, or a combination of the two. It is supplied with a small exhausting-fan s, which draws from the condenser the incondensable gases which may enter it with the vapors, and maintains in it a diminished pressure of a few inches of water below atmospheric pressure, which assists in drawing water-vapors from the retorts through the connecting-mains to the condenser. The water heated in this condenser by the char-vapors may be cold water from the cold-water main 6 or water from the condenser C of the evaporator D, brought to it by the pipe 7 after having passed through the heater B, or the water from the condenser C may come to it directly by the pipes 3 and 5.

P is a tank, into which flow and collect the portions of fresh water respectively heated by the char-vapors in the condeser A, by the char-washings in the heater B, and in the condensers of the multiple effect Q, and from which the heated water is taken by the pump O and delivered into the condenser J as fast as the butterfly-valve o, automatically operated by the float in the condenser, permits. The flow of heated water into this tank P is automatically governed to correspond to that taken from it by the pump O—that is, to that used in the refinery—by floats resting upon the surface of the water in the tank and connected by cords or other suitable adjustable means with butterfly-valves—one $a$ in the cold-water-feed pipe 6 to the condenser A, one $b$ in the cold-water-feed pipe 5 to the heater B, and one $x$ in the hot-water-discharge pipe from the heaters of the multiple effect Q. The lengths of the connecting-cords between the floats and the valves may be varied so that the valves shall be all closed simultaneously or to corresponding degrees by the rising of the water in the tank, or so that they shall be closed in succession and in any order desired. With the lengths of the cords fixed as indicated in the drawings, a diminishing demand for hot water in the refinery and a consequent continued rise in the level of the water in the tank P would stop in succession the heating of water by the char-vapors, supposing cold water be used in the condenser A, by the char-washing, and by the multiple effect.

In addition to the above-mentioned elements of the apparatus, the liquor, steam, and water pipes contain stop-valves for directing and controlling the flow of their respective contents. The relative elevations of the several apparatus are supposed to be such that the flowings of water referred to in this specification are effected by gravity, excepting where pumps are shown for moving the water.

Pumps may be used between the several apparatus when desirable.

The method of using the above-described apparatus in the practicing of my process is as follows: The exhaust-steam of the engines and pumps passes from the same either into the high-pressure exhaust-main E or into low-pressure exhaust-main F. The low-pressure exhaust-steam is used in the surface-heater H for heating the raw liquors to a degree, depending upon the pressure of the said exhaust-steam, preparatory to their passing into the blow-ups I, to be heated therein to the ultimate degree desired by high-pressure exhaust-steam. It is used in the vacuum evaporating-pan D, whose case it enters through the branch pipe $f'$, for thickening certain of the refined liquors after leaving the bone-black and before passing into the vacuum-pans, in the condenser J, for heating to an additional degree the fresh water which has been already partially heated by the water-vapors from the kilns, by the char-washings, and by the multiple effect Q, and it may be used for other heating purposes to which its pressure adapts it. The pressure in the low-pressure exhaust-main may much of the time be below atmospheric pressure, and when so the air that may leak into it or pass into it with the steam is removed from the heater H, the condenser J, and evaporator D, in which the air would necessarily collect by the air-pumps with which they are respectively provided. The high-pressure exhaust-steam is used in the multiple effect for evaporating sweet waters in the vacuum-pans for boiling liquors to make certain grades of sugar, in the blow-ups for heating the raw liquors, in the heater K for completing the heating of the fresh water, and in other apparatus for minor heating purposes. All of the pumps and engines may have exhaust-connections to both the high-pressure exhaust-main E and the low-pressure exhaust-main F; but it will be sufficient if enough of the pumps and engines have the double exhaust-connections, so that when all of them are exhausting into the high-pressure exhaust-main the steam supplied by the latter will meet the maximum demands made upon the same during the ordinary working of the house. The remainder of the pumps and engines have exhaust-connections only to the low-pressure exhaust-main F. The desired pressure in the high-pressure exhaust-main E is maintained by exhausting a greater or less number of the engines and pumps into it, the number varying with the demands of the apparatus which draw their supply of steam from the main. A number of the engines or pumps may be kept constantly exhausting into this main, and the fluctuations in the demand for steam be met by throwing on or off one or more additional engines. The pressure-regulating valve $l$ in the live-steam main L and the relief escape-valve N of the exhaust-main E supply indications as to whether engines are to be thrown onto or off from the exhaust-main E. If the former opens to allow live steam to enter the main, it shows that exhaust-steam is lacking, and that the exhaust from one or more additional engines should be turned from the low-pressure exhaust-main into the high-pressure exhaust-main, while, on the other hand, the opening of the relief-valve N to permit the escape of steam indicates that too many engines are exhausting into the high-pressure main, and that some of them should be thrown onto the low-pressure main F. By thus throwing engines onto or off from the high-pressure main, as may be required, the live-steam-supply valve $l$ and the relief-valve M are both kept closed, which means that the pressure of steam in that main is preserved between the limits ten and fifteen pounds, for example, supposing those to be the pressures at which the two valves have been respectively set, and also that the high-pressure exhaust-steam supply just meets the demand. Among these "regulating" engines and pumps, so to term them, should be a number of small ones and others of various sizes, so that the regulation may be done to a nicety.

The sequence which I prefer to follow in heating, as a part of this process, fresh water for the purposes of the refinery is as follows: A portion of the water to be heated is passed through the heaters $h'$ $h^2$ $h^3$, &c., of the multiple effect Q, and is progressively heated by the vapors from the several effects in succession to an ultimate temperature, which will vary with the conditions. In the case of a quintuple effect having fifteen pounds pressure of steam in the case of the first effect it would be about 212° Fahrenheit. Ignoring heat lost by radiation from the apparatus, all the heat contained in the exhaust-steam, which passes into the first effect and which causes the evaporation of the sweet water in the multiple effect, may be collected in the said fresh water and in the water of condensation formed in the several effects, so that the one quantity of heat both thickens the sweet water and heats fresh water, no heat being used in the multiple effects which does not afterward pass into the fresh water, including the said water of condensation. The construction and mode of operation of this apparatus for heating by multiple effects are fully shown and described in a pending application for a patent, Serial No. 327,622, filed October 21, 1889. Another portion of the cold fresh water is employed in the condenser C of the evaporator D, in which it is warmed by the heat absorbed by it in condensing the vapors from the evaporator, which heat, it is to be observed, was originally in the exhaust-steam supplied to the evaporator from the main F. From the condenser C this warmed water is sent through the pipes 1 3 into and through the surface-heater B, in which it is additionally heated by the hot char-washings, and whence it flows by the pipe 7 into condenser A, in which it condenses the water-vapors from the bone-black kilns, (not shown,) which are collected and led to it through the conduit 12, and is heated thereby to a still higher degree. From the condenser A the heated water flows by the pipe 13 into the tank P, in which it mixes with the heated water flowing into it from the multiple-effect heaters by the pipe 11. The water thus partially heated in the several manners just described is taken by the pump O and sent through the pipe 14 into the condenser J of the low-pressure exhaust-main F, in which it is additionally heated by the low-pressure exhaust-steam, providing the temperature of the latter is higher than that of the water, and from the condenser J it continues down into the condenser or heater K, in which it is finally heated by the high-pressure exhaust-steam to any temperature desired which is below that of the exhaust-steam, the pressure-regulating valve $r$ in the high-pressure exhaust-main being set so as to maintain in the heater a sufficient pressure of steam to heat the water to the temperature wished for. The check-valve $n$ in the pipe 15, which leads from the condenser J down into the heater K, serves to prevent any flow of water and steam back from the latter into the former in the event of the accidental occurrence at any time of an abnormally great difference in pressure between the two, and in case of a cessation of the supply of water to the condenser J the check-valve prevents any escape of steam from the heater K, (in which it is, may be, under from five to fifteen pounds pressure,) through the pipe 15, into the condenser J and the low-pressure exhaust-main F. The water thus finally heated is used for the various purposes of the refinery—washing bone-black, melting sugars, and the like. The flow of the fresh water through the system of heating apparatus is made to be equal to the flow of the heated water away from the heater K, through the main 16, by the floats (all indicated by dotted lines) in the heater K, condenser J, and in the tank P, and the valves which they control in the several supply and connecting mains. Any deficiency in the supply of water from the condenser C of the evaporator D is met by cold fresh water from the main 5 or from the main 6, or from both, the flow of cold water into the system through the mains 5 and 6 being automatically maintained just sufficient to keep the pump O supplied by the butterfly-valves $b$ $a$, operated by the floats (indicated by dotted lines) in the tank P, with which they are connected by cords or other suitable means. The said deficiency in the supply of water of the condenser C may also be made up by warm water taken from the condenser C' of the graining-pan by the pipe 2' if the water used in the condensers of the graining-pans is of a character that may employed for the other purposes of the refinery, which, however, is usually not the case. The water-connections to and from the heater B and condenser A allow cold fresh water alone to be passed through each.

In the drawings but two exhaust-mains, one high-pressure and one of a lower pressure, are shown; but my process would include the use of a greater number than two—three exhaust-mains, for example—in which three different pressures of exhaust-steam would be maintained, respectively, each of which would be used for the purposes of the refinery to which it might be best adapted.

The object in having two or more exhaust-steam mains in which different pressures are maintained and in using steam from the several mains each for the heating and evaporating purposes, which its pressure and temperature permits it to serve, but without encroaching upon the heating and evaporating domain, so to speak, of the exhaust-steam of lower pressures, if there be such, is to reduce to the minimum the quantity of exhaust-steam of the refinery consistent with its being used for an extended range of heating and evaporating purposes, and its heat thereby being utilized. A large portion of the heating and evaporating in a sugar-refinery may be done by exhaust-steam having a pressure of some ten to fifteen pounds per square inch, (240° to 250° Fahrenheit;) but a large amount of this heating and evaporating can be done with steam of lower pressures and temperatures, some with steam below atmospheric pressure, and other portions of it with steam of intermediate pressures; but it can of course all be done with high-pressure exhaust-steam—i. e., of ten to fifteen pounds pressure—so far as the requirements as to temperature are concerned; but for a given amount of power exerted by a steam engine or pump the quantity of exhaust-steam resulting will increase with the back-pressure upon the same, and consequently for the power required in any given refinery to do its mechanical work much more exhaust-steam will be obtained from its engines and pumps when they are all worked under a back-pressure of ten to fifteen pounds per square inch than would be the case if a goodly portion of them were worked under a lower back-pressure—say atmospheric. This is accomplished in the plant hereinbefore described by having two or more exhaust-steam mains for the engines and pumps in which different pressures are maintained, as set forth, and the result is that much less exhaust-steam is obtained from a sugar-refining plant than when there is but one common exhaust-main and one high back-pressure, as in the usual practice, and consequently more of the cold water, which has to be heated, may be used for other heat-recovering purposes than that of condensing and recovering heat from the exhaust-steam of the refinery. The pipe containing the valve N and leading from the high-pressure exhaust-main E into the low-pressure exhaust-main F serves to conduct any excess of high-pressure exhaust-steam which there may be above what is needed for the apparatus in which the high-pressure exhaust is used into the low-pressure exhaust-main F, there to supplement the exhaust from the engines and pumps which are worked under low back-pressure.

It is apparent that the exhaust-steam used in the first effect of the multiple effect Q might be replaced by live steam by the main 17, if desired, and especially so in cases where the exhaust-steam from the engines and pumps is not more than sufficient to meet the wants of the other steam-heating apparatus, which are supplied with steam from the exhaust-steam mains.

The evaporator D is shown in the drawings as a single effect. It may be a multiple effect, if preferred in any case.

Having thus described my invention, what I claim as mine is—

1. The within-described process of obtaining power and heating or evaporating effects from steam in sugar-refineries, consisting, first, in using it in engines and pumps for power purposes; second, in exhausting it from different but not fixed numbers of the said engines and pumps under different pressures, respectively, thereby obtaining portions of exhaust-steam having different pressures and corresponding temperatures; third, in using the different portions of exhaust-steam for heating or evaporating purposes at different temperatures, respectively, and, fourth, in varying the quantities of the said portions of exhaust-steam, so as to meet requirements, by varying the numbers of the engines and pumps from which the steam is exhausted at the different pressures, respectively, substantially as and for the purpose specified.

2. The within-described process of heating water in sugar-refineries, consisting in heating the water in succession by the vapors from the evaporating apparatus, by the char-washings, by the vapors from the bone-char kilns, and, finally, to the ultimate temperature desired by exhaust-steam from the engines and pumps, substantially as and for the purpose specified.

3. The within-described process of heating water in sugar-refineries, consisting in heating the water in succession by the char-washings, by water-vapors from the bone-char-revivifying kilns, and by exhaust-steam from the engines and pumps, substantially as and for the purpose specified.

4. The within-described process of obtaining power and heating effects from steam in sugar-refineries, consisting of using it in the engines and pumps for power purposes and exhausting it from different ones of the said engines and pumps under different pressures, thereby obtaining portions of exhaust-steam having different pressures and corresponding temperatures, and in using the said portions of exhaust-steam in succession in the order of their increasing pressures for heating water or other liquids to progressively higher temperatures, substantially as and for the purpose specified.

5. The within-described process of obtaining power and evaporating effects from steam in sugar-refineries, consisting in using it in steam engines and pumps for power purposes, in exhausting it from the different ones of the said engines and pumps under different pressures, thereby obtaining portions of exhaust-steam having different pressures and corresponding temperatures, and in using exhaust-steam of one of the said pressures for thickening to a degree the sugar-liquors as they come from the bone-black, and then exhaust-steam of a higher pressure to further evaporate the said liquor, as to the graining-point, for example, substantially as and for the purpose specified.

6. The within-described process of utilizing in sugar-refineries the heat contained in steam, consisting, first, in using it in the steam for the multiple-effect evaporation of the sugar solutions of the refineries; second, in using it in the vapors from two or more of the succeeding evaporations of the said multiple-effect evaporation for heating water to increasing degrees of temperature, and, finally, in using it in the water thus heated to assist in dissolving sugars, washing bone-black, and for other purposes in the process of sugar-refining, substantially as and for the purpose specified.

7. The within-described process of evaporating liquids and heating water or other liquids by the heat contained in the exhaust-steam from steam engines and pumps, consisting in using a portion of the exhaust-steam in the multiple-effect evaporation of liquids and in the heating of the said water or other liquid by vapors in succession from two or more of the succeeding evaporations of the said multiple-effect evaporation, and, finally, in heating the water or liquid thus partially heated to a higher temperature by another portion of the exhaust-steam used directly, as in a surface or spray condenser, substantially as and for the purpose specified.

8. The combination, in a sugar-refinery, of a high-pressure exhaust-main, an apparatus supplied with steam therefrom, a low-pressure exhaust-main and apparatus supplied with steam therefrom, and one or more steam engines or pumps, each having an exhaust-steam connecting-pipe to each of the exhaust-mains, the said connecting-pipes having suitable valves for directing exhaust-steam from the engine or pump into the one or into the other exhaust-main, substantially as and for the purpose specified.

9. The combination of a high-pressure exhaust-main, a low-pressure exhaust-main, a steam engine or pump having an exhaust-pipe containing a check-valve and leading to the high-pressure exhaust-main, and a second exhaust-pipe containing a stop-valve and leading to the low-pressure exhaust-main, substantially as and for the purpose specified.

10. The combination, in a sugar-refinery, of a high-pressure exhaust-steam main, with apparatus supplied with steam therefrom, and steam engines or pumps exhausting into the main, automatically-operating means for maintaining a pressure of steam in said high-pressure exhaust-main between desired maximum and minimum pressures, a low-pressure exhaust-main with steam engines or pumps exhausting into the same, a relief-valve for the said low-pressure exhaust-main automatically opening to permit an escape of steam from the main when the pressure in the same rises above a desired maximum pressure, and apparatus drawing and using steam from the low-pressure exhaust-main, the pressure in the low-pressure exhaust-main being determined or fixed by the said relief-valve, and the condensing capacities of the apparatus drawing steam from the main, substantially as and for the purpose specified.

11. The combination, in a sugar-refinery, of a low-pressure exhaust-main and apparatus supplied with steam therefrom, a high-pressure exhaust-main and apparatus supplied with steam therefrom, steam engines or pumps with exhaust-connections leading only to the low-pressure main, and steam engines and pumps, each with two exhaust-connections, one leading to the high-pressure exhaust-main and the other to the low-pressure exhaust-main, the said two exhaust-connections being provided with valves for deflecting exhaust-steam from the engine or pump into one or the other of the two exhaust-mains, substantially as specified.

12. The combination of a high-pressure exhaust-main, with steam engines or pumps exhausting steam into it and apparatus supplied with steam from it, a low-pressure exhaust-main, with steam engines or pumps exhausting steam into it and apparatus supplied with steam from it, and a pipe provided with a valve connecting the two exhaust-mains, the said connecting-pipe and valve affording means of passing steam from the high-pressure exhaust-main into the low-pressure exhaust-main, to supplement the steam exhausting into the latter from the steam engines or pumps connected with it, substantially as and for the purpose specified.

13. The combination of a high-pressure exhaust main and apparatus supplied with steam therefrom, a low-pressure exhaust-main and apparatus supplied with steam therefrom, a live-steam main opening into the high-pressure exhaust-main, provided with an automatic pressure-regulating valve operating to allow live steam to pass into the high-pressure exhaust-main whenever the pressure in the latter falls below the pressure for which the regulating-valve is set, an automatic relief-valve for the high-pressure exhaust-main operating to allow an escape of steam from the said exhaust-main whenever the pressure therein exceeds the pressure for which the said relief-valve was set, and steam engines or pumps, each having valved exhaust-connections to each of the said exhaust-mains, a pressure-regulating valve in the said live-steam main, and the said automatic relief-valve serving as indices of the times when the exhaust from engines or pumps shall be thrown onto or off from the high-pressure exhaust-main, substantially as and for the purpose specified.

14. In a sugar-refinery, the combination of a condenser of a vacuum-evaporating apparatus, a surface-heater for heating water by means of the char-washings, having induction and eduction pipes for the char-washings, a condenser for the water-vapors from the char-revivifying kilns, with an induction-main for the vapors, the water-supply pipe, as c, for the condenser of the vacuum-evaporator, a water-conducting pipe leading from the said condenser to the said surface-heater, a water-conducting pipe leading from the surface-heater to the condenser for the char-vapors, and a hot-water-discharge pipe for the said condenser for the char-vapors, substantially as and for the purpose specified.

15. In a sugar-refinery, the combination of the condenser of a vacuum-evaporating apparatus, a surface-heater for heating water by means of the char-washings, and having induction and eduction pipes for the char-washings, a water-supply pipe for the condenser of a vacuum-evaporator, a water-conducting pipe leading from the said condenser to the said surface-heater, and a heated-water-discharge pipe for the surface-heater, substantially as and for the purpose specified.

16. In a sugar-refinery, the combination of a surface-heater for heating water by means of the char-washings, and having induction and eduction pipes for the char-washings, a condenser for the water-vapors from the char-revivifying kilns, having an induction-main for the vapors, a cold-water-supply pipe to the surface-heater, a water-conducting pipe for heated water leading from the surface-heater to the condenser of the char-vapors, and a hot-water-discharge pipe from the said condenser for the char-vapors, substantially as specified.

17. The combination of two or more heating apparatus for heating water, and each having a water-supply pipe and a heated-water-eduction pipe, a tank into which the heated water from the said two or more heating apparatus flows and from which the heated water is drawn for various purposes, valves, one for each of the heating apparatus, for controlling the flow of water through the same, and floats in the said tank, one for each of the said valves, and connected with the same by adjustable connections, the floats being operated by the fluctuations of the level of the water in the tank to open or close to greater or less degrees the said valves, and in an order depending upon the adjustments of the connection between the floats and their respective valves, substantially as and for the purpose specified.

18. The combination, in a sugar-refinery, of a condenser with proper eduction and induction pipes for condensing water, a low-pressure exhaust-steam main leading to the said condenser, and having exhaust-pipes of certain of the engines and pumps of the refinery opening into it, a second condenser located at a lower level than the first condenser, for the purpose described, a high-pressure exhaust-steam main connected with the exhaust-pipes of certain of the engines and pumps of the refinery leading into the second condenser, a water-conducting main leading from the first or low-pressure condenser into the second or high-pressure condenser to supply water to the latter for condensing purposes, and a water-eduction pipe for the said second condenser, substantially as and for the purpose specified.

19. The combination, in a sugar-refinery, of a low-pressure exhaust-steam condenser, a high-pressure exhaust-steam condenser, with exhaust-steam mains leading to each and operated substantially as described, and means for delivering water from the former condenser into the latter condenser against the difference in pressure existing between the two, substantially as and for the purpose specified.

20. The combination, in a sugar-refinery, of a low-pressure exhaust-steam condenser, a high-pressure exhaust-steam condenser, respectively operating substantially as described, a water-conducting pipe leading from the former into the latter, and regulating means in the said pipe automatically operated by the rise and fall of the level of the water in the high-pressure condenser to decrease or increase, respectively, the flow of water through the said pipe from the low-pressure condenser into the high-pressure condenser, substantially as and for the purpose specified.

21. The combination, in a sugar-refinery, of a low-pressure exhaust-steam condenser, a high-pressure exhaust-steam condenser, respectively operating as described, a water-conducting pipe leading from the first condenser into the second condenser, and means in the said pipe—as a check-valve, for example—for preventing any flow of liquid or steam backward through the pipe from the high-pressure condenser into the low-pressure condenser, substantially as and for the purpose specified.

S. MORRIS LILLIE.

Witnesses:
ERNEST HOWARD HUNTER,
C. S. CHAMPION.